Aug. 16, 1966     C. THOMAS     3,266,109
COUPLING-CLAMP
Filed Feb. 4, 1965
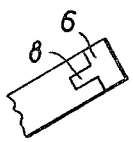
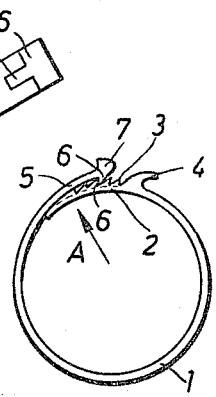
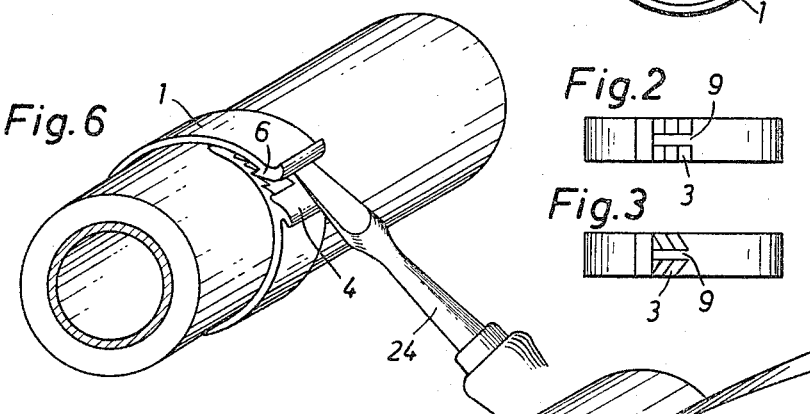
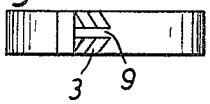
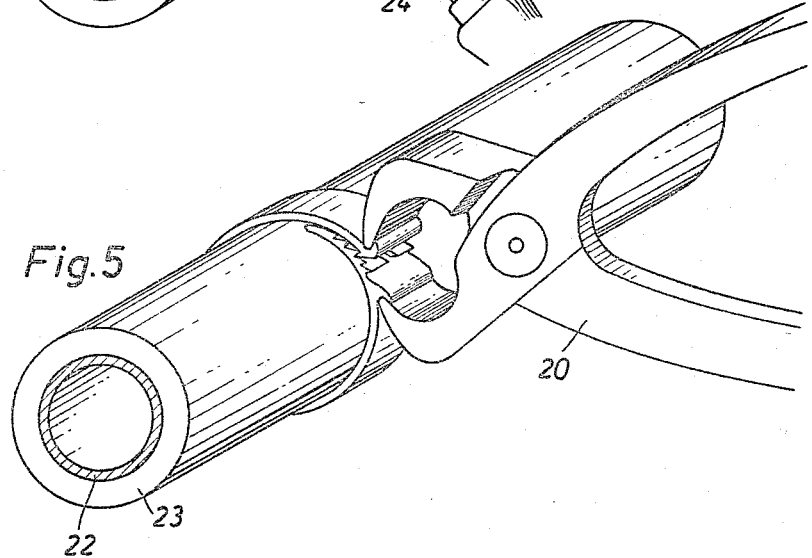
INVENTOR
CARL THOMAS

United States Patent Office 3,266,109
Patented August 16, 1966

3,266,109
COUPLING-CLAMP
Carl Thomas, Hamburg-Bergedorf, Germany, assignor to Jurid Werke G.m.b.H., Glinde, near Hamburg, Germany
Filed Feb. 4, 1965, Ser. No. 430,251
6 Claims. (Cl. 24—20)

This invention relates to clamps and is concerned with providing a clamp for effecting a coupling, as for instance in hose couplings to clamp the hose securely around the particular coupling, such as is used for sealing a hose on a support.

The invention comprehends among other features, a clamp formed as a single unit and made of a spring-like material, providing a band adapted to encircle hoses or other members of various diameters after which the ends of the band are forced into over-lapping and single locking engagement against the spring-like action of the material from which the band is made.

It is an object of the present invention to provide a hose clamp being free of any folds such as has been devised heretofore in common one-piece radially opening hose clamps.

It is a further object of the invention to provide a clamp of a very simple construction effective in its operation and the diameter of which is adjustable in accordance to the even thickness of the hose to be clamped.

Yet another object of the invention is to provide a clamp for frequent use in which the ends of the band when arranged in locking relation, are held against a relative longitudinal movement but which ends are to loosen or release in a simple manner.

A further object of the present invention is to provide a one-piece, radially opening hose clamp having a plurality of teeth formed on the external surface at one end thereof and only one inwardly directed tooth formed at the other end thereof, said other end being arranged to overlap said one end and said teeth being formed for gripping engagement with each other, in which a groove extending parallel to the longitudinal axis of the clamp is formed in the row of teeth located on the external surface of the clamp, and in which a spring disposed adjacent to the inwardly directed tooth is arranged to engage in said groove, and which clamp, preferably is provided with a projecting lug on the external surface of the clamp adjacent to each of the ends thereof, and the teeth being formed in a herring-bone array; alternatively, the teeth being disposed at right-angles to the longitudinal axis of the clamp.

Another object is to provide a clamp being of particular advantage since it can be made from synthetic plastics materials, especially polyamides.

Other and further objects will appear from the following description in which reference is to be had to the accompanying drawings, constituting a part of this specification, in which similar characters of reference denote corresponding parts in all the views, and in which:

FIG. 1 is a sectional view of a hose clamp according to the present invention;

FIG. 2 is a plan view of the clamp of FIG. 1 with straight teeth;

FIG. 3 is a plan view of the clamp of FIG. 1 with teeth in a herring-bone array;

FIG. 4 is a view of the counter-tooth and spring taken in the direction of the arrow A of FIG. 1;

FIG. 5 is a view of a hose clamp in accordance with the present invention during fastening thereof; and FIG. 6 is a view of a hose clamp in accordance with the invention during loosening thereof by means of a screw-driver.

The clamp according to the present invention as shown in FIG. 1 comprises a pipe band 1, one end 2 of which is provided with several teeth 3 and a projecting lug 4 and the other end 5 of which is formed with a counter-tooth 6 and a projecting lug 7. The clamp can be drawn together radially around a hose 23 mounted on a support 22. The band 1 is able to be tightened or pressed on by hand to such an extent that the counter-tooth 6 engages with one of the teeth 3. In order to produce the desired contact pressure on the hose or on the support the projecting lugs 4 and 7 are then pressed together, for example by means of a pair of pliers 20 (see FIG. 5), whereby—according to the energy applied—the counter-tooth 6 is caused to move into engagement with another of the teeth 3. The coupling connection is thus produced extremely rapidly.

If one wishes to loosen or release the coupling connection subsequently, this can be effected in a simple manner, as illustrated in FIG. 6, for example by means of a screw-driver 24 or a screw-driver type of tool in the manner illustrated, whereby the counter-tooth 6 is raised by using the projecting lug 4 as a lever support. The connection can thus be loosened extremely rapidly.

As can be seen from FIG. 4, the counter-tooth 6 carries a spring 8 on its central part and extends outwardly to the projecting lug 7. It can be seen from FIG. 2 that a central groove 9 is provided in the end of the band 1 carrying the teeth 3, in which groove the spring 8 is adapted to engage in the fastened position of the clamp. Thus, axial displacement of the clamp is safely avoided.

The teeth 3 can be formed in a herring-bone array (FIG. 3) or in a straight arrangement (FIG. 2).

Any of the usual materials can be used as the material for the clamp according to the invention. Particularly suitable are synthetic plastics materials, such as polyamides for example.

The one-piece clamp according to the invention can be directly manufactured in one piece. One-piece clamps can, however, also be assembled from prefabricated individual parts (smooth bands, end pieces with outwardly directed teeth and end pieces with one or more inwardly directed teeth) by methods familiar to the expert, such as by welding or by the use of adhesives. This latter type of manufacture has the advantage that with several different desired diameters of clamp, the end pieces can be made of standard size and the finished one-piece clamps can be prepared in the shortest time and in any desired number for dispatch.

Although I have illustrated a specific clamp, it is apparent that the invention is not limited to the specific forms of construction illustrated, but may be embodied as well in other forms of construction within the scope of the appended claims.

I claim:
1. A clamp comprising a resilient band having one of its ends formed with a plurality of teeth extending on the external surface thereof and having the other of its ends formed with only one inwardly directed tooth, said other end being arranged to overlap said one end and said teeth being formed for gripping engagement with each other, in which a groove extending parallel to the longitudinal axis of the clamp is formed in the row of teeth located on the external surface of the clamp, and in which a spring disposed adjacent to the inwardly directed tooth is arranged to engage in said groove.

2. A clamp comprising a resilient band having one of its ends formed with a plurality of teeth and a projecting lug extending on the external surface thereof and having the other of its ends formed with only one inwardly directed tooth and a projecting lug extending externally, said other end being arranged to overlap said one end and said teeth being formed for gripping engagement with each other, in which a groove extending parallel to the longitudinal axis of the clamp is formed in the row of teeth located on the external surface of the clamp, and in which a spring disposed adjacent to the inwardly directed tooth is arranged to engage in said groove.

3. The clamp of claim 2 in which said plurality of teeth are arranged in a herring-bone array.

4. The clamp of claim 2 in which said plurality of teeth are disposed at right-angles to said longitudinal axis.

5. A clamp comprising a resilient band formed of a synthetic plastics material and having one of its ends formed with a plurality of teeth and a projecting lug extending on the external surface thereof and having the other of its ends formed with only one inwardly directed tooth and a projecting lug extending externally, said other end being arranged to overlap said one end and said teeth being formed for gripping engagement with each other, in which a groove extending parallel to the longitudinal axis of the clamp is formed in the row of teeth located on the external surface of the clamp, and in which a spring disposed adjacent to the inwardly directed tooth is arranged to engage in said groove.

6. The clamp of claim 5 in which said plastics material is a polyamide.

References Cited by the Examiner

UNITED STATES PATENTS

| | | | |
|---|---|---|---|
| 210,560 | 12/1878 | Robertshaw | 24—20 |
| 712,765 | 11/1902 | Cole | 24—20 |
| 1,330,737 | 2/1920 | Coffman | 24—20 |
| 1,441,154 | 1/1923 | Johnson | 24—20 |

BERNARD A. GELAK, *Primary Examiner.*